United States Patent
Barton et al.

(10) Patent No.: US 6,555,255 B2
(45) Date of Patent: Apr. 29, 2003

(54) POLYMERIC ORGANIC COATINGS AND METHOD OF MANUFACTURE THEREOF

(75) Inventors: Carlos L. Barton, Brooklyn, CT (US); Thomas A. P. Seery, Willington, CT (US); Hanrong Gao, Lake Hiawatha, NJ (US); Jayanthi Jacob, Carmel, IN (US)

(73) Assignees: World Properties, Inc., Lincolnwood, IL (US); The University of Connecticut, Storrs, CT (US)

(*) Notice: Subject to any disclaimer, the term of this patent is extended or adjusted under 35 U.S.C. 154(b) by 42 days.

(21) Appl. No.: 09/813,641

(22) Filed: Mar. 21, 2001

(65) Prior Publication Data

US 2001/0038925 A1 Nov. 8, 2001

Related U.S. Application Data

(60) Provisional application No. 60/192,126, filed on Mar. 24, 2000.

(51) Int. Cl.$^7$ .............................. H01J 1/62; B32B 9/00; C09K 11/00

(52) U.S. Cl. ........................ 428/690; 428/917; 428/403; 428/407; 427/66; 427/299; 427/372.2; 313/503

(58) Field of Search ................................. 428/690, 917, 428/403, 407; 313/503; 427/66, 299, 372.2

(56) References Cited

U.S. PATENT DOCUMENTS

| | | | |
|---|---|---|---|
| 4,902,829 A | * | 2/1990 | Toyoda et al. ............... 313/503 |
| 5,418,062 A | | 5/1995 | Budd |
| 5,439,705 A | | 8/1995 | Budd |
| 5,593,782 A | | 1/1997 | Budd |
| 5,609,970 A | * | 3/1997 | Kolb et al. .................. 428/690 |
| 6,193,908 B1 | * | 2/2001 | Hampden-Smith et al. .................. 252/301.4 R |

FOREIGN PATENT DOCUMENTS

WO  WO 00/05313 A  *  2/2000

OTHER PUBLICATIONS

Watson, Keith J. et al, "Hybrid Nanoparticles with Block Copolymer Shell Structures", 1999, Journal of American, Chemical Society, 21, 462–463, and Supporting Information.

von Werne et al., "Preparation of Structurally Well–Defined Polymer–Nanoparticle Hybrids with Controlled/Living Radical Polymerizations", Journal of the American Chemical Society, vol. 121, No. 32, pp. 7409–7410 (1999).

Jordan et al., "Surface–Inititated Anionic Polymerization of Styrene by Means of Self–Assembled Monolayers", Journal of the American Chemical Society, vol. 121, No. 5 pp. 1016–1022 (1999).

Prucker et al., "Synthesis of Poly(styrene) Monolayers Attached to High Surface Area Silica Gels through Self–Assembled Monolayers of Azo Initiators", Macromolecules, vol. 31, No. 3, pp. 591–601 and 602–613 (1998).

Schrock et al., "Ring–Opening Polymerization of Norbornene by a Living Tungsten Alkylidene Complex", Macromolecules, vol. 20, 1169–1172 (1987).

(List continued on next page.)

*Primary Examiner*—Cynthia H. Kelly
*Assistant Examiner*—Dawn Garrett
(74) *Attorney, Agent, or Firm*—Cantor Colburn LLP

(57) ABSTRACT

Polymeric organic coating for electroluminescent lamp components, particularly for phosphor particles and electrodes and a method of making same, wherein the polymer is formed using an initiator, preferably by ring-opening metathesis polymerization. A dense hydrophobic organic coating is formed which is capable of protecting the electroluminescent device components from exogenous agents such as moisture and eventual degradation. The polymer layer may be attached to an outer surface of the component by one or more tethering layers.

14 Claims, 4 Drawing Sheets

OTHER PUBLICATIONS

Schrock, "Living Ring–Opening Metathesis Polymerization Catalyzed by Well–Characterized Transition–Metal Alkylidene Complexes", R. R. Accounts of Chemical Research, vol. 23, pp. 158–165 (1990).

Grubbs, "Polymer Synthesis and Organotransition Metal Chemistry", R. H. et al., Science, vol. 243, pp. 907–915 (1989).

Sooklal et al., "Photophysical Properties of ZnS Nanoclusters with Spatially Localized Mn2+", J. Phys. Chem., vol. 100, No. 11, pp. 4551–4555 (1996).

Huang, et al., "Preparation of ZnxCd1–xS Nanocomposites in Polymer Matrices and Their Photophysical Properties", Langmuir, vol. 14, No. 15, pp. 4342–4344 (1998).

Chan, et al., "Quantum Dot Bioconjugates for Ultrasensitive Nonisotopic Detection", Science, vol. 281, pp. 2016–2018 (1998).

Correa–Duarte et al., "Stabilization of CdS semiconductor nanoparticles against photodegradation by a silica coating procedure", Chemical Physics Letters, vol. 286, No. 5–6, pp. 497–501.

Dabbousi, "Fabrication and Characterization of Hybrid Organic/Inorganic Electroluminescent Devices Based on Cadmium Selenide Nanocrystallites (Quantum Dots)", Submitted to the Dept. of Chem. at the MA Institute of Technology, 160 pages (1997).

* cited by examiner

POLYMERIC ORGANIC COATINGS AND METHOD OF MANUFACTURE THEREOF

CROSS-REFERENCE TO RELATED APPLICATION

This application claims priority to U.S. Application Serial No. 60/192,126, filed Mar. 24, 2000, which in incorporated by reference herein in its entirety.

BACKGROUND OF THE INVENTION

1. Field of the Invention

This invention relates to components for electroluminescent devices. In particular, this invention relates to polymeric coatings for the components, which provide enhanced environmental protection for the components.

2. Description of the Related Art

Electroluminescent (EL) lamps are an attractive alternative to conventional lighting systems, especially for display and backlighting devices. A typical EL lamp consists of a dielectric layer and a light-emitting phosphor layer sandwiched between two conductive surfaces, a transparent front electrode, and a rear electrode. The primary purpose of the dielectric layer is to allow the lamp to withstand higher voltages without shorting between the conductive surfaces. The phosphor layer comprises phosphor particles, typically zinc sulfide or other phosphorescent particles known in the art, suspended in a polymeric matrix. The transparent electrode comprises a transparent ceramic, typically indium tin oxide (ITO).

One of the major technological barriers to the widespread use of EL lamps has historically been the sensitivity of the lamp components, particularly the phosphor particles and the electrode, to environmental conditions such as moisture. In addition, ITO electrodes are relatively unstable and may be susceptible to electrochemical reduction during lamp operation. Improvements in the adhesion of ITO electrodes to the phosphor layer are also desireable.

One method of protecting EL lamp components from moisture is to shield the entire EL lamp assembly in a fused, water resistant (polychlorotrifluoroethylene) envelope. However, this method limits the configurations that the EL assembly may attain.

Another method of protecting the phosphor particles is by the microencapsulation of each individual phosphor particle in a glass-like ceramic coating, as described in U.S. Pat. Nos. 5,593,782; 5,439,705; and 5,418,062 to Budd. Attempts to attach pre-formed, organic polymers to the phosphor particles, however, result in only a very small amount of the polymer being immobilized onto the phosphor surface, as once the surface is becoming significantly covered, additional polymers, which are trying to reach the surface, have to diffuse against the concentration gradient built up by the already deposited polymer chains. Polymer layers formed by such a "grafting to" technique is therefore intrinsically limited to low graft density and low film thickness.

There accordingly remains a need in the art for alternative approaches for the protection of EL lamp components such as phosphors and ITO electrodes. There further remains a need for methods to improving the adhesion of ITO electrodes to the phosphor layer.

SUMMARY OF THE INVENTION

The above discussed and other drawbacks and deficiencies of the related art are overcome or alleviated by a protective coating for electroluminescent device components, particularly for metal parts such as phosphor particles and electrodes, comprising a hydrophobic, organic polymer.

In one embodiment, the electrode is indium tin oxide and the organic polymer is a linear polymer formed by ring opening metathesis polymerization.

In another embodiment, the phosphor is zinc sulphide and the organic polymer is a linear polymer formed by ring opening metathesis polymerization, wherein the linear polymer is attached to the phosphor by a tethering layer.

The polymeric organic, hydrophobic coating may accordingly be manufactured by the attachment of a functional group or a functionalized tethering layer to the surface of the components, followed by polymerization of the coating from the functional groups. Polymerization from the functional groups may be carried out by any chain polymerization process, including ring-opening metathesis, wherein the functional groups are first derivatized with a catalyst, followed by polymerization to form the hydrophobic coating.

This method overcomes certain steric and diffusional barriers usually encountered in the coating of components with organic polymers. Unlike other methods, a dense coating is formed, which greatly enhances the protective quality of the coating. The above discussed and other features and advantages of the present invention will be appreciated and understood by those skilled in the art from the following detailed description and drawings.

BRIEF DESCRIPTION OF THE DRAWINGS

Referring now to the exemplary drawings wherein like elements are numbered alike in the several FIGURES.

DETAILED DESCRIPTION OF THE PREFERRED EMBODIMENTS

A process for protecting and extending the life of EL lamp components comprises use of a hydrophobic, organic polymer coating on the surface of the components. The organic polymer coating preferably comprises long chain hydrocarbons, preferably formed by chain growth polymerization from an immobilized initiator on an outer surface of the component. A variety of other polymerization reactions may also be used, for example, radical, cationic, and anionic polymerizations. The initiator may be directly attached to the surface, or linked to the surface by an organic or inorganic tethering layer. In an advantageous feature, attachment of the initiator to the surface or formation of the functionalized tethering layer allows tight packing of the initiators. Subsequent polymerization from these initiators therefore overcomes the steric and diffusional limitations inherent in coating particles with preformed polymers.

Where the initiator is directly attached to an outer surface of the component, for example an ITO. electrode, formation of the hydrophobic, polymer coating accordingly first comprises attachment of the initiator to the outer surface of the electrode. The initiator is a catalyst or other active moiety that is directly usable for initiation of polymerization. Exemplary initiators include but are not limited to a halogen group, preferably bromine, which provides sites from which to initiate anionic polymerization; an azoisobutyronitrile (AIBN) group, which can be used to initiate radical polymerization; and 4-chloromethylphenyl, which may be used to initiate atom transfer radical polymerization as described by von Werne et al., Journal of the American Chemical Society, Volume 121, No. 32, pp. 7409–7410 (1999). Halogenated groups may be lithiated with sec-butyl lithium to initiate anionic polymerization upon addition of monomer, following Jordan et al., Journal of the American Chemical Society; Volume 121, No. 5, pp. 1016–1022 (1999). Examples of radical polymerizations that have been initiated from silica surfaces using tethered AIBN moieties may be found in the work of Prucker et al., in Macromolecules, Volume 31, No. 3, pp. 591–601 and 602–613 (1998).

In a preferred embodiment, the initiator is effective in ring opening metathesis polymerization (ROMP). ROMP is a variant of the olefin metathesis reaction, using strained, cyclic olefins. ROMP is well known, being described, for example, by Schrock, et al., in Macromolecules, Volume 20, 1169 (1987); Schrock, R. R. Accounts of Chemical Research, Vol. 23, p. 158 (1990); and Grubbs, R. H. et al., Science, Volume 243, p. 907 (1989).

Figure 1:
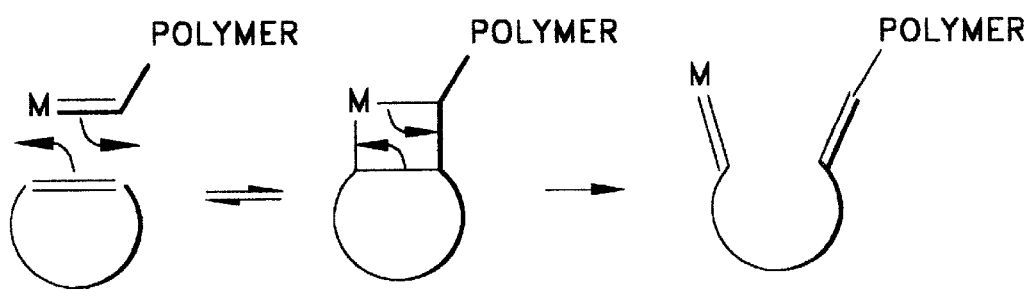
FIG. 1 is a schematic illustration of ring opening metathesis polymerization (ROMP).

Without being bound by theory, a [2+2] cycloaddition reaction between a transition metal (M) alkylidene complex and a strained, cyclic olefin forms an intermediate metallocyclobutane (see FIG. 1). The intermediate metallocyclobutane then breaks up to a "new" olefin, which, by virtue of the cyclic structure of the olefin monomer, remains attached to the catalyst and as part of a growing polymer chain. As the driving force for the ROMP reaction is the relief of ring strain, the reaction is essentially irreversible and the polymers produced in the ROMP reaction can have a very narrow range of molecular weights. A further advantageous feature is that ROMP systems may produce stereoregular and monodisperse polymers and co-polymers, or may be used to make diblock and triblock co-polymers, thereby permitting tailoring the properties of the resulting material polymerization catalysts.

Suitable strained olefins for use in ring opening metathesis polymerization include, but are not limited to, norbornene, cyclooctadiene, trans-5-norbornene-2,3-dicarbonyl chloride and the like.

Catalysts suitable for use in ring opening metathesis polymerization generally include those useful for olefin metathesis in general, including but not being limited to ruthenium-, molybdenum-, and tungsten-based alkylidene complexes. Ruthenium complexes are presently preferred and have the formula $(R_3P)_3RuX_2(=CH\tilde{R})$ wherein R is an alkyl, cycloalkyl, or aromatic group having from 1 to about 10 carbon atoms, preferably cyclohexane; X is a halide, preferably chloride; and $\tilde{R}$ is an alkyl group or aromatic group having from 2 to about 30 carbons, for example phenyl. A preferred ruthenium-based alkylidene complex is $(\{C_6H_{11}\}_3P)_3RuCl_2(=CHPh)$. Other catalysts include, but are not limited to the tungsten and molybdenum alkylidenes disclosed in Schrock.

Figure 2:
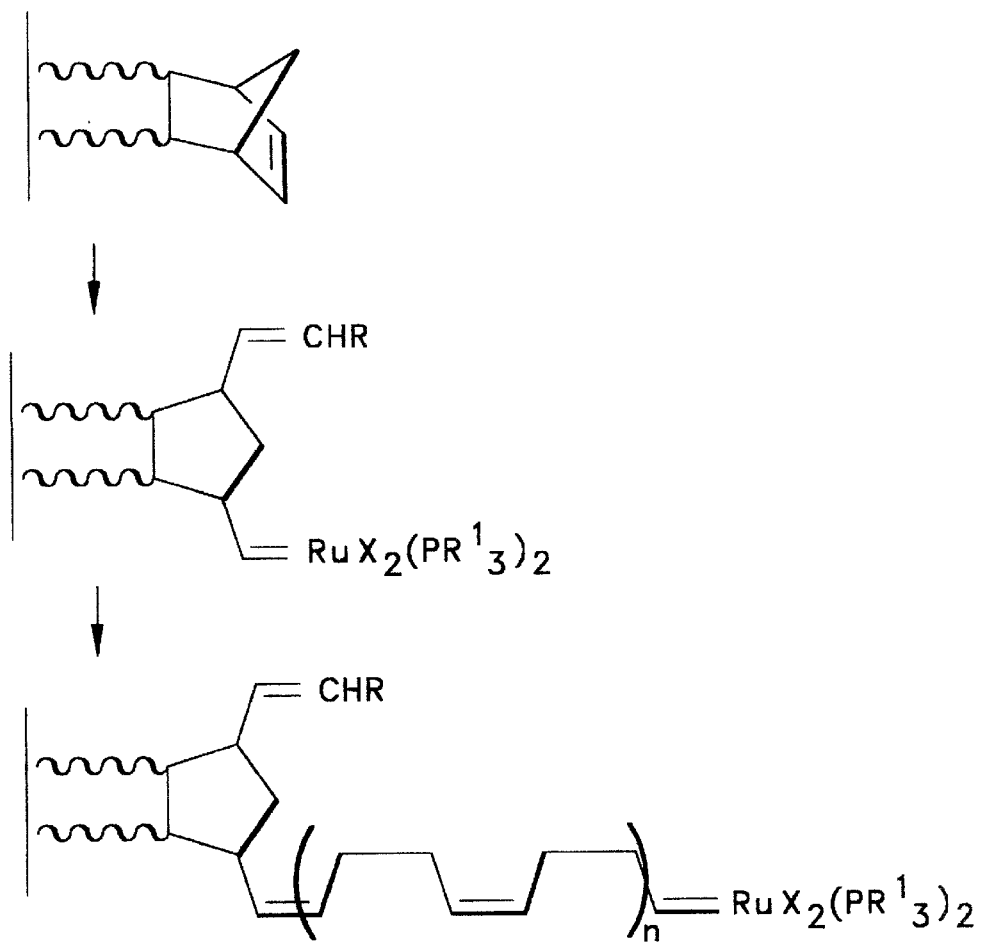
FIG. 2 is a schematic illustration of one embodiment of a method of manufacture of a protective coating for an ITO electrode, wherein the coating comprises a strongly attached, hydrophobic, organic polymer formed by ROMP.

As shown in FIG. 2, polymerization by ring opening metathesis requires attachment of a ROMP initiator to an outer surface of the component to be protected. A variety of suitable methods for strong attachment (via reaction, chemisorption, or very strong physical adsorption, e.g.) of initiators to the surface of EL components may be used. ITO electrodes, for example, may be treated with a reactive, strained olefin derivative such as 5-(bicycloheptenyl) methyldichlorosilane. The metal catalyst is then attached to the component by reaction with the norbornenyl group, generally under mild conditions. The amount of catalyst employed is from about 0.1 wt % to about 10.0 wt %, based on the theoretical weight of the norbornenyl groups. The tethered ruthenium catalyst is then used to initiate the ring opening metathesis polymerization of a strained olefin, which results in the formation of a densely packed, hydrophobic organic coating on the component.

Alternatively, the initiator may be attached by a tether to the surface of the component, for example a phosphor. To form the hydrophobic, polymeric coating in this embodiment, a functionalized tethering layer is first formed on the particle surface. The functionalization is preferably external to the surface of the tethering layer, as the functional groups provide the sites for subsequent attachment of the hydrophobic polymer. Preferably, the tethering layer is formed from difunctional small molecules, such that a first functional group becomes attached to the phosphor surface, while a second, preferably different, functional group remains available for initiation or further reaction. More efficient packing is obtained where the first and second functional groups are different, or have different reactivity with the phosphor particle surfaces. Self-assembly of the small molecules provides particularly dense packing of the tethering layer.

Suitable small molecules preferably comprise linear hydrocarbons having no or minimal branching, and having from about 2 to about 30 carbon atoms, preferably about 3 to about 18 carbon atoms. Linear hydrocarbons are preferred, as they can become tightly packed and oriented perpendicular to the surface of the particles. The linear hydrocarbons may themselves contain other functional groups such as ethers, as long as the other functional groups do not interfere with formation or subsequent reaction of the tethering layer.

One functional group on the small molecule (hereinafter the "first functional group" for convenience) is selected for tight attachment to an outer layer of the component, for example a phosphor particle surface. Suitable phosphor particles include, for example, zinc sulphide, and zinc sulphide-based phosphors, gallium arsenide, cadmium sulphide and cadmium sulphide-based phosphors, zinc selenide and zinc selenide-based phosphors, and strontium sulphide and strontium sulphide-based phosphors, or combinations thereof. Zinc sulphide-based phosphors in particular are known in the art to contain compounds such as copper sulphide, zinc selenide, and cadmium sulphide either in solid solution within the zinc sulphide particles or as domains within the particles. The phosphor particles as used herein can exist in many sizes, which largely depends on their particular application. The first functional group is selected so as to attach either to the phosphor particle surface directly, or to another layer external to the particle surface. Effective first functional groups for direct attachment to zinc sulphide phosphors are sulfide (—SH) groups or silane (—Si) groups.

In one embodiment, the second functional group is an initiator, i.e., is a group that is directly usable for initiation of polymerization. In another embodiment, the second functional group is selected so as to provide a site for further reaction, i.e., to attach a second tethering layer or an initiator. Exemplary difunctional small molecules of this embodiment include but are not limited to mercaptoalkane alcohols and mercaptoalkenes, for example 6-mercaptohexan-1-ol, 12-mercaptododecane-1-ol (dodecanethiol alcohol), 11-mercaptoundecan-1-ol, or 10-mercaptodecene-1. Another exemplary small molecule of this type is a norbornenyl ether-functionalized alkanethiol wherein the alkane has from about 3 to about 18 carbon atoms. Synthesis of such thiols is known, being described by Watson et al. in the Journal of the American Chemical Society, Volume 121, p. 460 (1999). Another exemplary class of small molecules is mercaptoalkyltrialkoxysilanes, wherein the alkyl groups are linear alkyl groups preferably having from about 2 to about 7 carbon atoms, and the alkoxy groups are linear alkoxy group having no or minimal branching, and having from 1 to about 3 carbon atoms, preferably 1 carbon atom. An exemplary member of this group is 3-mercaptopropyltrimethoxysilane.

The temperature, relative quantity of small molecules, and components (e.g., phosphor particles), and other reaction conditions for formation of the tethering layer will vary depending on the identity and reactivity of the small molecules and the phosphor particles (or the outermost layer of the phosphor particle), and is readily determined by one of ordinary skill in the art. It has been found, for example, that layers formed from neat thiols on ZnS are more stable than those formed from solutions of thiols.

In one exemplary process for the formation of a small molecule tethering layer (FIG. 3), phosphor particles such as ZnS particles are added to a liquid, difunctional tether such as dodecanethiol alcohol. The liquid or solid tether may also be dissolved in an inert solvent such as methylene chloride, hexane, heptane, cyclohexane, benzene, toluene, xylene, and the like. The first functional group (the thiol) attaches strongly (via chemisorption, e.g., or very strong physical adsorption) to the particle, leaving the second functional group (the alcohol) free for further reaction. The tethering layer thus comprises the dodecanethiol alcohol strongly attached to the ZnS surface as an array of tightly packed molecules aligned radially to the ZnS surface, with the alcohol groups on the outside. The alcohol group may be used as an initiator, for example in the titanium alkoxide mediated polymerization of isocyanates. Other exemplary second functional groups include halogens, preferably bromine, which provide sites from which to initiate anionic polymerization; an azoisobutyronitrile (AIBN) group, which can be used to initiate radical polymerization; 4-chloromethylphenyl that can initiate atom transfer radical polymerization as described above. Halogenated groups may be lithiated with sec-butyl lithium to initiate anionic polymerization upon addition of monomer, following Jordan et al.

Alternatively, the alcohol group or other second functional group may be used for further reactions such as attachment of an initiator, or attachment of a second tethering layer. Subjecting the second functional group to further reaction in order to attach the initiator is particularly preferred where the initiator is reactive, for example those used in ring opening metathesis polymerization.

Figure 3:
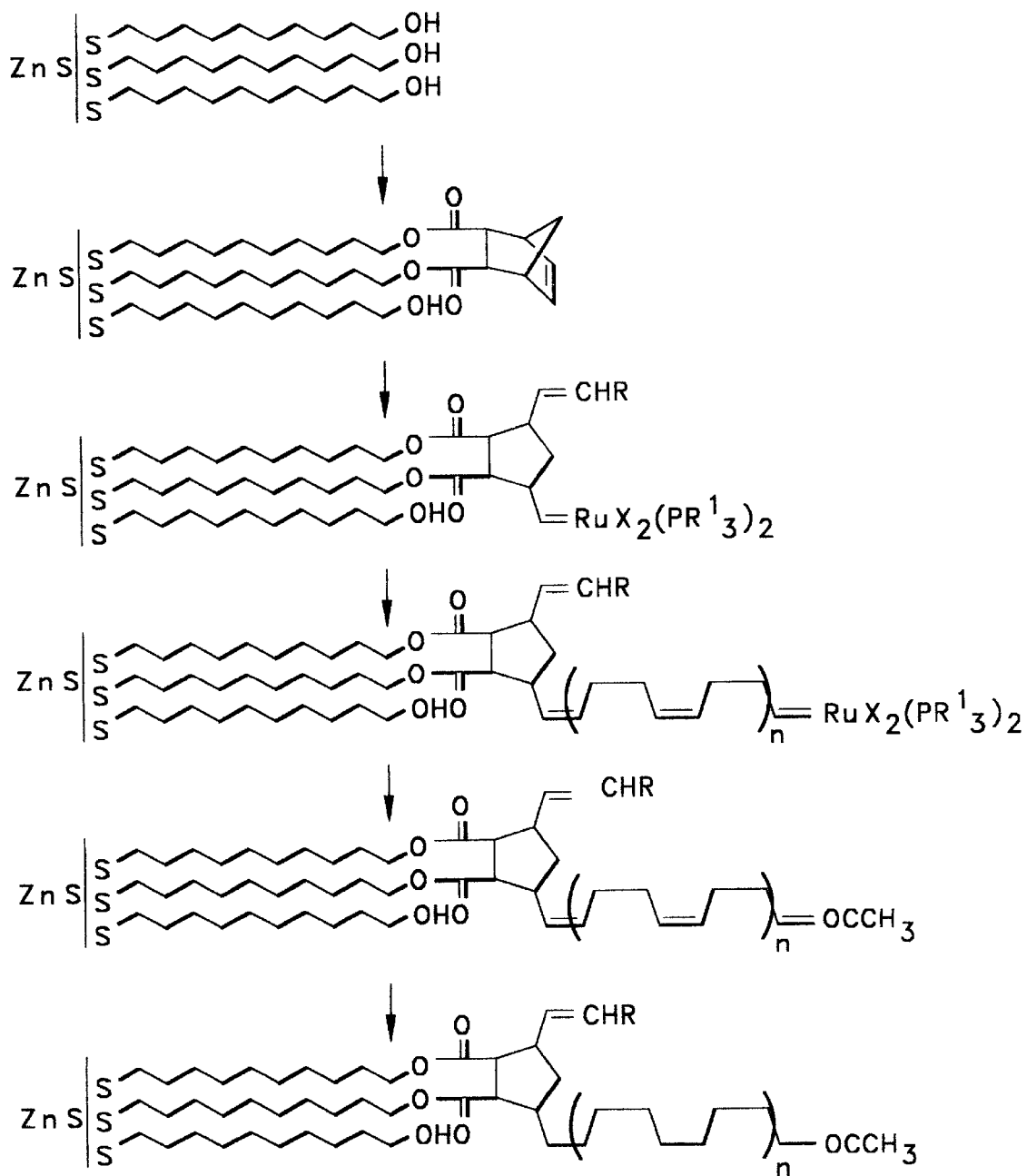
FIG. 3 is a schematic illustration of one embodiment of a method of manufacture of a protective coating for phosphor particles, wherein the coating comprises a strongly attached, hydrophobic, organic polymer formed by ROMP.

Continuing to refer to FIG. 3, attachment of a ROMP catalyst to a dodecanethiol alcohol tether requires derivatization of the alcohol functional group with a strained olefin, for example by treatment of the alcohol with norbornenyl dicarbonylchloride. The metal catalyst is then attached to the particle by reaction with the norbornenyl group, generally under mild conditions. The amount of catalyst employed is from about 0.1 wt % to about 10.0 wt %. When the tethering layer is formed from a norbornenyl ether-functionalized dodecanethiol, the catalyst may be attached directly to the norbornenyl group.

The tethered ruthenium catalyst is then used to initiate the ring opening metathesis polymerization of a strained olefin as shown in FIG. 3. After a sufficient time, the polymerization is terminated, for example, by reaction with acyclic terminal olefins that possess an oxygen next to the olefin, i.e., vinyl ether, vinyl acetate, and the like. For a given weight of phosphor, the molecular weight of the polymer chain (coating thickness) is determined by the amount of the monomer in the solution and the conditions of the reaction before termination.

Further reaction of the polymer coating is also possible when functional groups are present in the polymer. The unsaturated groups present after ROMP, for example, represent opportunities for nucleophilic addition, hydrogenation, crosslinking and the like. Such reaction allows further adjustment of the character of the polymeric coating.

The above description illustrates that the methods described herein may be used to protect a variety of EL lamp components, including but not limited to the phosphor particles, the electrodes, any filler particles in the dielectric layer (for example barium titanate, titanium oxide, and the like), and other metal surfaces, as long as a functionalized surface, or a tethering layer is present or can be attached.

Figure 4:
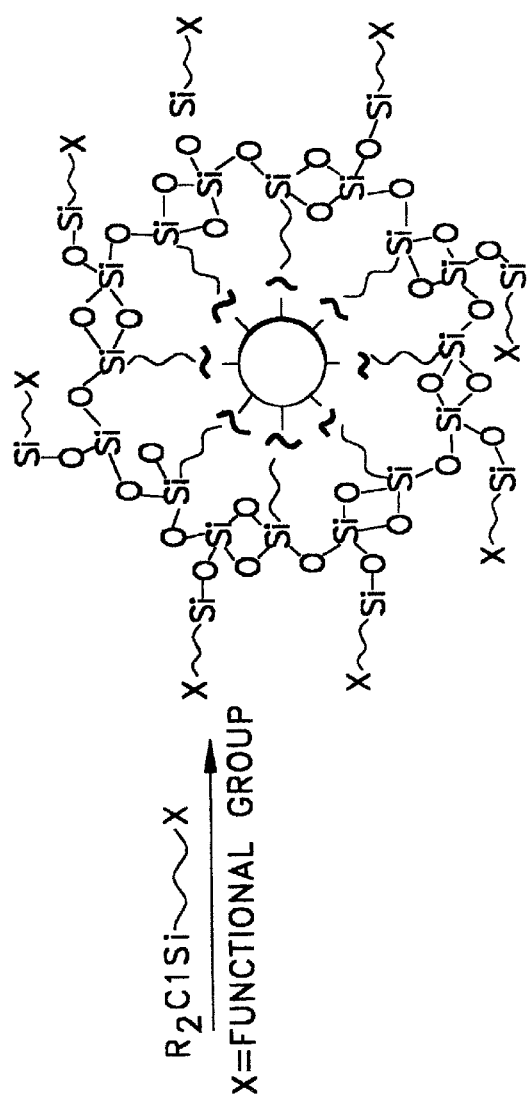
FIG. 4 is a schematic illustration of another embodiment of a method of manufacture of a protective coating for phosphor particles, wherein the coating is tethered to the particle by a silicon oxide layer.
Figure 4:
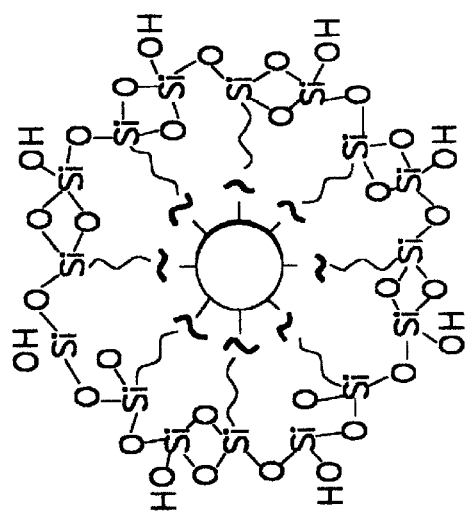

Multi-layer coatings (tethering surfaces) are useful for fine-tuning the properties of the polymeric coatings. Such multi-layer tethering surfaces are available by a number of different synthetic routes. For example, a component (a phosphor particle, e.g.) may be provided with a hydroxysilane coating using the procedures of the Budd patents, or as shown in FIG. 4. Treatment of hydroxysilyl groups with a functionalized, substituted dichlorosilane results in the formation of a tethering layer characterized by free functional groups X. These free functional groups may then be used to attach a second tethering layer, other functional groups, or initiators for polymerization.

Figure 5:
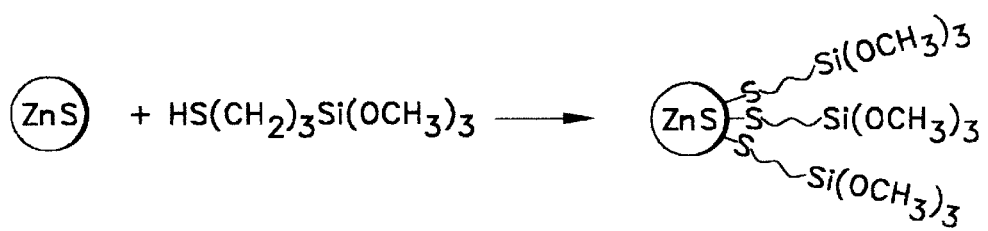
FIG. 5 is a schematic illustration of another embodiment of a method of manufacture of a protective coating, wherein the coating is tethered to the particle by a silicon oxide layer.
Figure 5:
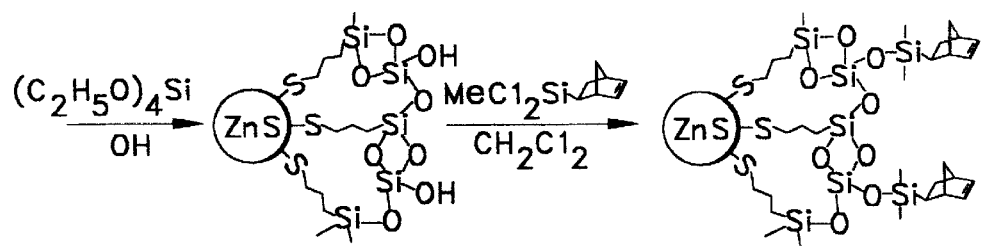
Figure 5:
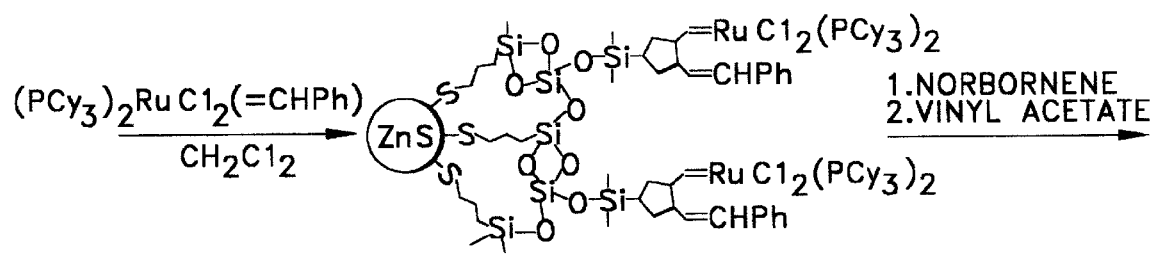
Figure 5:
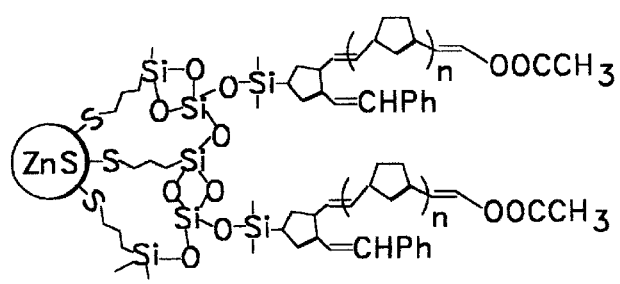

As shown in FIG. 5, for example, a hydroxysilyl layer may be deposited onto a phosphor particle by reaction with a trialkylsilyl alkylsilane. Treatment of the resulting tethered trialkyl silane with a tetralkoxy silane yields a hydroxysilane coating, which is suitable for further reaction. In FIG. 5, the hydroxysilane coating is reacted with 5-(bicycloheptenyl) methyldichlorosilane, which results in attachment of a norbornenyl group for reaction with the ROMP catalyst. Polymerization may then be effected by reaction with norbornene, and termination by reaction with vinyl acetate.

All patents and references cited herein are incorporated by reference in their entirety.

The invention is further illustrated by the following non-limiting examples.

EXAMPLES

Materials and Analyses

11-Mercaptoundecan-1-ol ($HO(CH_2)_{11}SH$), 3-mercaptopropyltrimethoxysilane ($HS(CH_2)_3Si(OCH_3)_3$), norbornene dicarbonylchloride, aqueous ammonium hydroxide (28–29%) and tetraethoxysilane were purchased from Aldrich. ($Cy_3P)_2RuCl_2$(=CHPh) (wherein Cy is a cyclohexyl group) was obtained from Strem. ZnS powder was provided by Rogers Co., and had a particle size in the range from about 20 to about 40 microns. Methylene chloride and methanol were dried by refluxing over $CaH_2$ and $NaOCH_3$, respectively, under $N_2$ atmosphere. Ethanol (200 proof) was used as obtained from commercial sources without further purification.

DRIFT (Diffuse Reflectance Infrared Fourier Transform) spectra were recorded on a Nicolet 560 spectrophotometer equipped with an MCT detector. A Harrick diffuse reflectance accessory was used in the compartment. The spectra were recorded with samples in the Harrick microsampling cup. Thermogravimetric analyses (TGA) were performed on a Perkin Elmer TGA-7. Transmission electron microscope (TEM) analyses were recorded on a Philips EM300.

Formation of a hydrophobic coating on the particles was further tested by storage at room temperature in an aqueous 1.0 N silver nitrate solution, as free thiol reacts with silver nitrate to give a distinct yellow soapy precipitate, and uncoated ZnS particles turn black.

Example 1

Formation of an Alkane Thiol Monolayer on ZnS Powder

ZnS particles were treated first with dilute aqueous HCl then with dichloromethane and finally stirred in dodecane thiol in methanol for between 2 and 24 hours. Gas chromatography-mass spectroscopy (GC-MS) of the particles indicated absorption of dodecane thiol onto the ZnS particles. Washing the particles with ethanol did not appear to affect the stability of the tethering layer, although washing with hexane did reduce its stability.

The ZnS particles treated with dodecane thiol were stable in the silver nitrate solution for about 2 days, and no yellow precipitate was observed even after vigorous shaking of the particles in the solution. These results support the presence of a chemisorbed coating on the ZnS particles.

Example 2

Formation of Functionalized Alkane Thiol Layers on ZnS Powder 2.5 grams (g) of ZnS powder were stirred in 10 mL of aqueous HCl (2 N) at room temperature for 4 hours. After filtration, the powder was washed with $CH_3OH$ (3 times, 10 mL each) and $CH_2Cl_2$ (3 times, 10 mL each), then dried under vacuum at room temperature. The resulting ZnS powder was further stirred in neat 6-mercaptohexan-1-ol ("6-MHO"), 11-mercaptoundecan-1-ol ("11-MUDO"), or 10-mercaptodecene-1 ("10-MDE") at about 70° C. for 5 hours. After the thiol was removed by filtration, the solid ZnS powder was washed with $CH_3OH$ (4 washes, 10 mL each) and $CH_2Cl_2$ (4 washes, 10 mL each) and then dried under vacuum to yield the modified ZnS powder.

IR DRIFT spectra of the modified ZnS powders show IR absorptions of the C—H stretching vibrations at 2945 (s) and 2865 (m) $cm^{-1}$ for the 6-mercaptohexan-1-ol modified ZnS powder ("6-MHO/ZnS"); 2926 (s), 2854 (m) $cm^{-1}$ for the 11-mercaptoundecan-1-ol modified ZnS powder ("11-MUDO/ZnS"); and 3074 (w), 2918 (s), and 2850 (m) $cm^{-1}$ for the 10-mercaptodecene-1 modified ZnS powder ("10-MDE/Zn"). After the modified powders were washed with $CH_2Cl_2$ 10 times, the intensities of the IR absorptions of the powders did not change, indicating that the thiols are strongly adsorbed onto the ZnS powder surface.

Example 3

Attachment of Metal-Alkylidene Catalysts to the Functionalized ZnS Powder

MUDO/ZnS (1.0 g) was stirred in a $CH_2Cl_2$ (10 mL) solution of norbornene dicarbonylchloride (0.3 mL) at room temperature in the presence of triethylamine (0.3 mL) for 3 h. After filtration, the powder was washed with $CH_3OH$ (3 times, 10 mL each) and $CH_2Cl_2$ (3 times, 10 mL each) and dried under vacuum to give the norbornenyl group tethered ZnS powder NBE-MUDO/ZnS. IR (DRIFT): $\nu(C=O)$ 1730 $cm^{-1}$.

6-MHO/ZnS was similarly treated to yield NBE-MHO/ZNS powder showing a new band at 1730 $cm^{-1}$, indicating that the norbornyl group has been linked to the surface of the thiol layer by reaction between the hydroxyl group on the surface and the carbonyl chloride group.

Each of the norbornyl-linked ZnS powders (1 g) was next stirred in 10 mL of $CH_2Cl_2$ with 0.08 g $(Cy_3P)_3RuCl_2$ (=CHPh) at room temperature for 2 hours. After filtration, the solid was washed with $CH_2Cl_2$ (4 times, 10 mL each) and dried under vacuum to yield the ZnS powder with a tethered ruthenium catalyst ("Ru-MHO/ZnS" and "Ru-MUDO/ZnS"). Each of the DRIFT spectra of Ru-6-MHO/ZnS and RU-11-MUDO/ZnS shows the peak of the PCH bonding model at around 1450 $cm^{-1}$, suggesting that the ruthenium complex of the type $(Cy_3P)_2RuCl_2(=CHR)$ is tethered to the ZnS surface.

Example 4

Formation of a Polymer Coating Tethered to ZnS With MUDO

Each of the modified ZnS powders with tethered ruthenium catalyst was used to initiate the polymerization of norbornene to form a polymer layer on the powder surface. 1.0 g of each of the powders was stirred in a solution of norbornene (2 g of norbornene in 10 mL of $CH_2Cl_2$) at room temperature overnight. Then, 3 drops of vinyl acetate were added to terminate the polymerization. After the solid was washed with $CH_2Cl_2$ (3 times, 10 mL each) and extracted with $CH_2Cl_2$ overnight in a Soxhlet extractor, the resulting powder was dried at 60° C. under vacuum for about 5 hours. A comparison of the DRIFT spectra of the unmodified ZnS powder, the thiol-modified ZnS powder and the polymer-coated ZnS powder showed that the intensities of the C—H absorptions greatly increased after the surface initiated polymerization, indicating that polynorbornene is formed on the powder surface. The polynorbornene appears to be strongly attached on the ZnS surface, as the polymer cannot be washed off by $CH_2Cl_2$.

The polymer-coated ZnS powder was immersed in an aqueous solution of 1.0 M $AgNO_3$, and the mixture was left overnight. Only part of the surface of the particles became gray-black, suggesting that the polymer can protect the reaction between the surface ZnS with the $AgNO_3$ in the solution, but that the polymer formed on the surface is not uniform. This may be due to the reaction between the surface-tethered hydroxyl group and the norbornene dicarbonylchloride being either not uniform or incomplete.

Example 5

Polynorbornene-Coated ZnS Powder Tethered with $SiO_2$.

1.5 g of ZnS powder was stirred in 10 mL of aqueous HCl (2 N) at room temperature for 2 hours. After filtration, the powder was washed with $CH_3OH$ (3 times, 10 mL each) and $CH_2Cl_2$ (3 times, 10 mL each), then dried under vacuum at room temperature. The resulting ZnS powder was stirred with 2.0 g of neat 3-mercaptopropyltrimethoxysilane at about 70° C. for about 5 hours. After the thiol was removed by filtration, the solid was washed with CH$_3$OH (2 times, 10 mL each) and CH$_2$Cl$_2$ (2 times, 10 mL each), then dried under vacuum at room temperature to give the thiol-modified ZnS powder (MPTS/ZnS). IR (DRIFT): (C—H) 2940(s), 2916(w,sh) and 2848 (s) cm$^{-1}$.

The MPTS/ZnS (1.5 g) was vigorously stirred in an ethanol (1.8 L) solution of aqueous ammonium hydroxide (29%, 40 mL) and tetraethoxysilane (1.0 mL) at room temperature for 48 h. After filtration, the solid was washed with ethanol and dried under vacuum at room temperature to give the SiO$_2$-coated ZnS powder SiO$_2$-MPTS/ZnS. IR (DRIFT): □(isolated HO—Si) 3570 cm$^{-1}$, □(hydrogen bounded HO—Si) 3550(br) cm$^{-1}$, □(Si—O) 1055 cm$^{-1}$.

The SiO$_2$-coated ZnS powder SiO$_2$-MPTS/ZnS (1.0 g) was stirred in a CH$_2$Cl$_2$ (10 mL) solution of 5-(bicycloheptenyl)methyldichlorosilane (0.3 mL) at room temperature in the presence of triethylamine (0.3 mL) overnight. After filtration, the solid powder was washed with CH$_2$Cl$_2$ (3 times, 10 mL each) and dried under vacuum at room temperature to give the norbornenyl group tethered ZnS powder NBE-SiO$_2$-MPTS/ZnS. IR (DRIFT): (H—C=) 3017 cm$^{-1}$.

The norbornyl-linked ZnS powder (1 g) was next stirred in 10 mL of CH$_2$Cl$_2$ with 0.08 g (CyP)$_3$RuCl$_2$(=CHPh) at room temperature for 2 hours. After filtration, the solid was washed with CH$_2$Cl$_2$ (4 times, 10 mL each) and dried under vacuum to yield the ZnS powder with a tethered ruthenium catalyst.

1 g of these powders was stirred in a solution of norbornene (2 g of norbornene in 10 mL of CH$_2$Cl$_2$) at room temperature overnight. Then, 3 drops of vinyl acetate were added to terminate the polymerization. After the solid was washed with CH$_2$Cl$_2$ (3 times, 10 mL each) and extracted with CH$_2$Cl$_2$ overnight in a Soxhlet extractor, the resulting powder was dried at 60° C. under vacuum for about 5 hours.

No color change was observed for the polynorbornene-SiO$_2$-MPTS/ZnS after the polymer coated ZnS powders was immersed in an aqueous solution of 1.0 M AgNO$_3$ overnight, although the surface changed to gray-black after immersion for about three days. These results suggest that the coated polymer can protect the reaction between the surface ZnS and the AgNO$_3$ in the solution, and the surface protection by the grafted polymer in PNBE-SiO$_2$-MPTS/SiO$_2$ is better than that in PNBE-MUDO/ZnS.

The amount of polynorbornene grafted on the ZnS surfaces depends on the concentration of the norbornene monomer in the polymerization solution if the other conditions are the same. This is demonstrated by the thermogravimetric analyses (TGA) of the PNBE-SiO$_2$-MPTS/ZnS samples obtained by using different norbornene concentrations. When 1.5 of NBE-SiO$_2$-MPTS/ZnS was treated in the CH$_2$Cl$_2$ (25 mL) solutions of norbornene at the concentrations of 0.5, 0.25, 0.2 or 0.1 M, the weight percentages of polynorbornene in the resulting PNBE-SiO$_2$-MPTS/ZnS samples are 25.0%, 20.0%, 8.2% and 6.3%, respectively.

Example 6

Polynorbornene-Coated ITO Electrodes

A polyester film coated (by vapor deposition) with a very thin layer of an indium-tin oxide film is soaked in a toluene solution containing 5-(bicycloheptenyl) methyldichlorosilane and a small amount of acetic acid. The film is removed from the solution, rinsed with dichloromethane, and baked at 100° C. for about 30 minutes. This film is then soaked in a very dilute solution of(CyP)$_3$RuCl$_2$(=CHPh) for about 30 minutes at room temperature. The ITO-catalyst film is then rinsed with methylene chloride, and soaked in a dilute solution (approx. 10 wt. % in dichloromethane) of norbornylene for about one hour at room temperature. A small amount of methanol or vinyl acetate is then added to halt the polymerization. The coated film is again rinsed with dichloromethane, dried, and used to construct and EL lamp using normal procedures.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An electroluminescent lamp, wherein a component of the lamp has a hydrophobic, polymeric organic coating, comprising a tethering layer on the exterior of the electroluminescent lamp component; and a hydrophobic organic polymer coating covalently bound to the tethering layer.

2. The electroluminescent lamp of claim 1, wherein the component comprises phosphor particles or an electrode.

3. The electroluminescent lamp of claim 2, wherein the phosphor particles comprise zinc sulphide, gallium arsenide, cadmium sulphide, zinc selenide, strontium sulphide, or combinations comprising at least one of the foregoing.

4. The electroluminescent lamp of claim 2, wherein the phosphor particles comprise zinc sulphide.

5. The electroluminescent lamp of claim 2, wherein the tethering layer comprises a linear hydrocarbon having from 2 to about 30 carbon atoms.

6. The electroluminescent lamp of claim 2, wherein the tethering layer comprises multiple layers.

7. The electroluminescent lamp of claim 6, wherein the tethering layer comprises a first layer of linear hydrocarbons adjacent the exterior of the electroluminescent lamp components, and a layer of silicon oxide between the first layer of linear hydrocarbons and the hydrophobic organic polymer coating.

8. An electroluminescent lamp assembly comprising electroluminescent components of made by a method comprising forming a tethering layer of small molecules on an outer layer of the components, wherein the tethering layer has a plurality of initiator groups external to the tethering layer surface; and polymerizing hydrocarbon monomers from the initiator groups to form a hydrophobic, organic polymeric coating attached to the tethering layer.

9. An electroluminescent lamp, wherein a component of the lamp has a hydrophobic, polymeric organic coating, comprising a hydrophobic organic polymer coating covalently bound to a metal oxide disposed on an outer surface of the component.

10. The electroluminescent lamp of claim 9, wherein the metal oxide is silicon oxide.

11. The electroluminescent lamp of claim 9, wherein the component comprises phosphor particles or an electrode.

12. The electroluminescent lamp of claim 11, wherein the phosphor particles comprise zinc sulphide, gallium arsenide, cadmium sulphide, zinc selenide, strontium sulphide, or combinations comprising at least one of the foregoing.

13. The electroluminescent lamp of claim 11, wherein the phosphor particles comprise zinc sulphide.

14. The electroluminescent lamp of claim 11, wherein the component is an indium-tin oxide electrode.

* * * * *